US007158916B1

(12) United States Patent
Yarian

(10) Patent No.: US 7,158,916 B1
(45) Date of Patent: Jan. 2, 2007

(54) METHOD FOR ANALYZING NET WEIGHTS OF PACKAGED GOODS

(76) Inventor: John C. Yarian, 15029 Portland Ave. South, Burnsville, MN (US) 55306

( * ) Notice: Subject to any disclaimer, the term of this patent is extended or adjusted under 35 U.S.C. 154(b) by 0 days.

(21) Appl. No.: 11/272,654

(22) Filed: Nov. 14, 2005

Related U.S. Application Data

(60) Provisional application No. 60/628,329, filed on Nov. 16, 2004.

(51) Int. Cl.
*G06F 11/00* (2006.01)

(52) U.S. Cl. ....................................... 702/173; 235/453

(58) Field of Classification Search ................ 702/173, 702/33, 41, 102; 177/2–5, 25.11; 235/87 A, 235/89 A, 453–454
See application file for complete search history.

(56) References Cited

U.S. PATENT DOCUMENTS 3,977,484 A * 8/1976 Kammerer .................. 177/165
4,419,734 A * 12/1983 Wolfson et al. ............. 702/129
4,657,097 A 4/1987 Griffen
4,760,539 A 7/1988 Amacher et al.
4,804,052 A 2/1989 Griffen
4,909,338 A 3/1990 Vitunic et al.
5,285,825 A * 2/1994 Townsley ...................... 141/9
5,550,328 A 8/1996 Freeman et al.
5,910,645 A 6/1999 Gerlach et al.
6,801,866 B1 10/2004 Yarian
2006/0151604 A1* 7/2006 Zhu et al. ................... 235/454

OTHER PUBLICATIONS

"Calibration of Weighing Machines" UKAS Pulication Ref: LAB 14, Edison 1, Mar. 2001, pp. 1-19.
"1997 Handbook 44 Field Manual" Stabler Training Resources, Inc., Publication No. 1.
"National Institute of Standards and Technology (NIST) Handbook 133" (2003).

* cited by examiner

*Primary Examiner*—Edward Raymond
(74) *Attorney, Agent, or Firm*—Haugen Law Firm PLLP

(57) ABSTRACT

A method for analyzing the net weight of packaged goods includes obtaining a sample lot having one or more samples of the packaged goods and recording a stated net weight value for each sample. A gross weight value for each of the samples is then measured. Further, a component weight value for each component making up a respective packaging of at least one of the samples is weighed for its individual contribution to an overall tare value. This overall tare value derived from the individual component weights is then taken from the gross weight value to obtain an actual net weight value for each sample. The actual net weight value may then be compared with the stated net weight value to determine whether an error exists.

6 Claims, 3 Drawing Sheets

METHOD FOR ANALYZING NET WEIGHTS OF PACKAGED GOODS

CROSS-REFERENCE TO RELATED APPLICATION

This application claims priority from U.S. provisional application Ser. No. 60/628,329, filed on Nov. 16, 2004 and entitled METHOD FOR ANALYZING NET WEIGHTS OF PACKAGED GOODS, the content of which is incorporated herein in its entirety.

FIELD OF THE INVENTION

The present invention relates to methods for testing and analyzing the net weight of packaged goods generally, and more particularly to a method and automated system for enhancing the accuracy of net weight assessments in packaged goods.

BACKGROUND OF THE INVENTION

In order to represent to customers an amount of commodity that is offered for sale within packages, it has become standard practice to identify a weight, volume, number of units, or size of the product contained within the packaging. Typically, the labeling of such packaging defining the contents therein is controlled by the commodity vendors, whether at the retail, distribution, or manufacturing level. Methods have therefore been put in place to ensure that the amount of product contained within the packaging is accurately stated, and, in particular, contains at least as much product as is represented on the respective packaging. Vendors have also employed techniques to ensure compliance with governmental regulations, as well as to ensure that the amount of product contained within the packaging is not significantly understated.

Many products, such as those offered for sale in, for example, grocery stores, are indicated as being packaged by weight. One method for determining the amount of product contained within packaging is described in the National Institute of Standards and Technology (NIST) "Handbook 133". This commonly utilized technique obtains the net weight of the product contained within the packaging by subtracting the weight of the packaging from the gross weight of the combination of the product and the packaging. The weight of the product packaging is typically referred to as the "tare" weight, and is determined by the methodology described in Handbook 133, and specifically by obtaining several examples of the product/packaging combination, removing the product from the packaging, drying the packaging if necessary, and weighing each package without the product contained therewithin. The tare is then computed as the average of the package weight values obtained as described above.

The above-described method, however, generalizes the packaging characteristics, and fails to analyze the impact that each packaging component has upon the overall tare value. As such, inconsistencies in individual package component weights, and the overall effect that such inconsistencies have on the stated product weight may not be realized until long after the inconsistencies occur, if ever. The conventional methods further fail to provide a mechanism for tracking package component weights over time and, as such, fail to enable corrective action in predicting and maintaining accurate product net weight values stated on the packaging, as well as standardizing packaging among uses in distinct applications and/or locations.

It is therefore a principal object of the present invention to provide a method for testing and analyzing the net weight of packaged materials that individually analyzes and accounts for each packaging component in the computation of a summed tare value.

It is a further object of the present invention to provide a summed tare value in the computation of net weight, which summed tare value is obtained from the average weights of each individual packaging component.

It is a still further object of the present invention to provide a method for testing and analyzing net weight of packaged goods that enables detection of inconsistencies in individual packaging component weights.

It is another object of the present invention to provide a method for testing and analyzing the net weight of packaged goods that accounts for change in weight over time of the packaging so that an accurate assessment of the package may be made as it stands at the time of purchase.

It is a further object of the present invention to provide a packaged component testing methodology that enables the standardization of product packaging among uses in distinct applications and/or locations.

SUMMARY OF THE INVENTION

By means of the present invention, the net weight of packaged goods may be more closely examined and more accurately stated. In particular, the method of the present invention provides for component analysis of the packaging materials, such that inconsistencies in component weight attributes may be immediately perceived and accounted for in the assessment of product net weight.

In a particular embodiment, the method of analyzing net weights of packaged goods includes obtaining a sample lot having one or more samples of the packaged goods, with each of the one or more samples being selected from one commodity line or a range of commodities utilizing the same packaging. A stated net weight value for each of the one or more samples is recorded for use in weight error calculations. A gross weight value for each of the one or more samples is then measured. Moreover, a component weight value for each component making up a respective packaging of at least one of the samples is then measured. From the components measured, an average component value is calculated and then utilized as an additive factor in a summation of each average component weight value into a summed tare. The actual net weight value for each of the one or more samples is calculated by subtracting the summed tare from the respective gross weight values of the one or more samples. Finally, a weight error value for each of the one or more samples is calculated by subtracting respective stated net weight values from respective actual net weight values.

Preferably, the method of the present invention includes assigning weight error tolerance levels to the weight error values, with a first error tolerance level corresponding to a negative weight error value that is less than the maximum negative value standard, a second error tolerance level corresponding to a negative weight error value equal to or exceeding the maximum negative value standard but that is less than a maximum allowable variation standard, and a third error tolerance level corresponding to a negative weight error value equal to or exceeding a maximum allowable variation standard.

An additional aspect of the present invention involves a system for analyzing net weights of packaged goods, with the system including a computer having a data processor and memory, and software that is executable through the computer, with the software establishing an operable data transfer interface between a scale and the computer, and further defining a data input and manipulation utility. This software utility preferably includes the steps of inputting a stated net weight value for each of one or more samples from a sample lot of the packaged goods into the computer through a data entry device. A gross weight value for each of the one or more samples is measured at the scale and imported into the computer. Likewise, a component weight value for each component making up a respective packaging of at least one of the samples is measured at the scale and imported into the computer. The software automatically determines an average component weight value for each component measured, and sums the average component weight values into a summed tare. The software further calculates an actual net weight value for each of the one or more samples by subtracting the summed tare from respective gross weight values for the one or more samples. In addition, the software preferably calculates a weight error value for each of the one or more samples by subtracting respective stated net weight values from respective actual net weight values, and outputs the weight error values to a visual display device operably coupled to the computer.

DETAILED DESCRIPTION OF THE PREFERRED EMBODIMENTS

The objects and advantages enumerated above together with other objects, features, and advances represented by the present invention will now be presented in terms of detailed embodiments with reference to the attached drawings which are intended to be representative of various possible embodiments of the invention. Other embodiments and aspects of the invention are recognized as being within the grasp of those having ordinary skill in the art.

Figure 1:
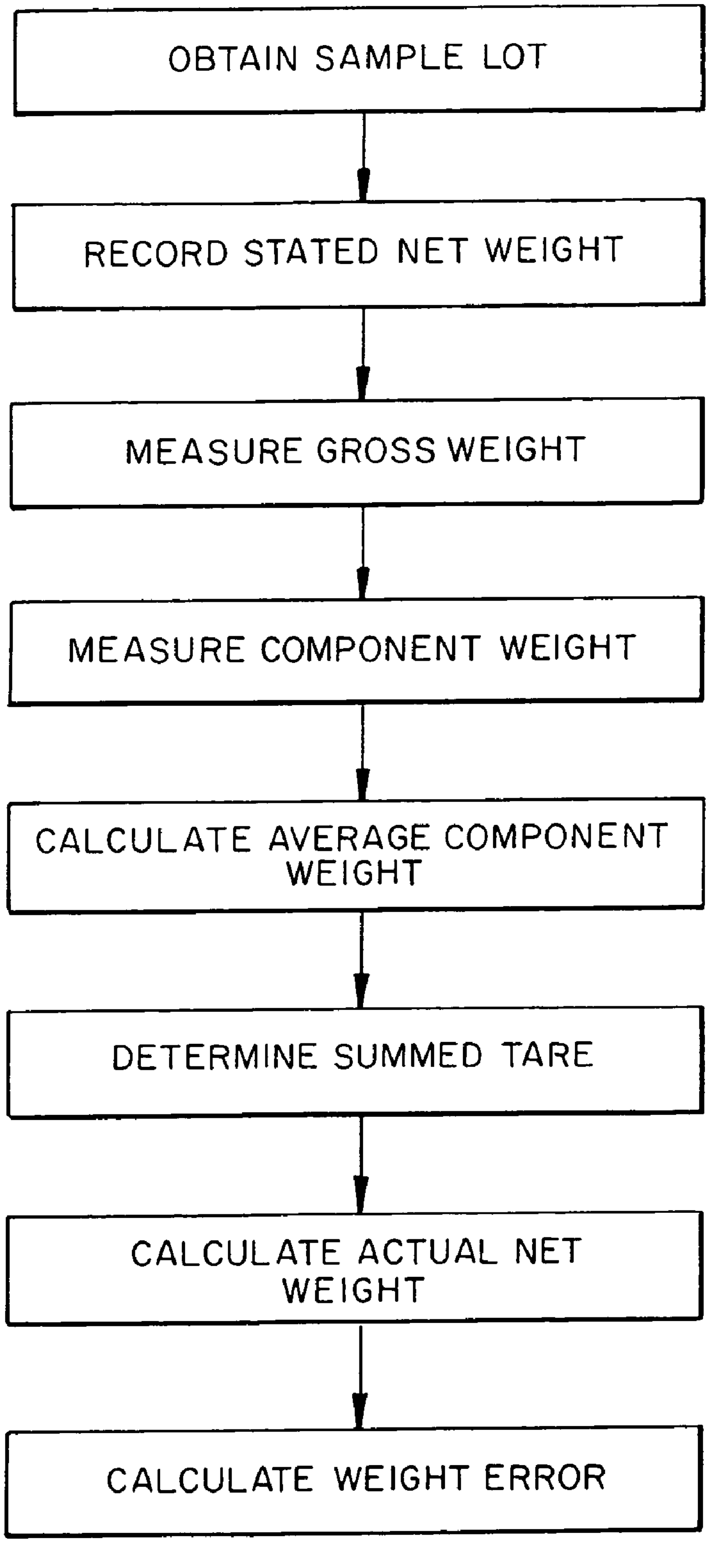
FIG. 1 is a flow diagram representing an analysis method of the present invention.

With reference now to the drawings, and first to FIG. 1, a flow diagram showing the individual steps making up a preferred embodiment of the method of the present invention is illustrated. In order to accurately analyze the net weights of packaged goods, the tester preferably obtains a sample lot having one or more samples of the packaged goods. Typically, at least three samples are utilized for each sample lot, though less than three samples may be used in the analysis method of the present invention where necessary. Such samples are preferably selected from a single class of packaged goods, such that the respective net weights of the packaged goods may be effectively compared. For example, particular classes of packaged goods may be, for example, one pound packages of ground beef, three pound packages of ground beef, one quart containers of deli salad, and the like. By selecting one or more samples from a particular class of packaged goods, a more consistent and accurate determination of the actual product net weight, as well as package component characteristics may be assessed.

Once the sample lot has been selected, the stated net weight value for each of the samples is recorded. The stated net weight is defined as the weight of the product itself within the package that is asserted by the vendor, packager, or labeler. A primary purpose of the present invention is to assess the accuracy of the product net weight that is stated on the packaging.

A gross weight value for each of the samples is then obtained by sequentially placing each of samples on a weighing device such as a scale. In preferred embodiments of the present invention, a class II scale is utilized. Such a weighing device provides a level of accuracy sufficient to provide confidence levels in the results obtained that are within governmental error guidelines. The gross weight of the sample is defined as the total weight of the packaging and product, with the packaging including such items as containers, trays, soakers, lids, wrapping, liners, decorations, manuals, and the like.

Once the gross weight values for each sample has been obtained, each component making up the packaging of at least one sample is measured by individually placing each component separately on the weighing device. As stated above, the components making up the packaging include each element that forms a part of the packaged goods which is not the goods themselves. Thus, the term "packaging" is intended to encompass for the purposes of this application all elements of the sold package that does not constitute the actual goods being stated under the net weight category. Accordingly, such packaging components include, for example, wrapping material, pans, covers, decorations, ornaments, tags, labels, promotional objects, and the like. Preferably, each component included in the packaged good sample is separately weighed to obtain a component weight value therefor. Preferably, the individual components of at least three samples are each weighed to obtain a corresponding component weight value for each component tested. In doing so, a sample component lot for each component is obtained, thereby enhancing the accuracy of results obtained directly from or extrapolated through the measured individual component weight values.

Though in preferred embodiments, each component of selected ones of the samples are weighed, it is also contemplated that certain of the components known to have a consistent weight among the various samples need not be repeatedly tested for weight. In other words, certain components, such as labels of the same dimensions and separately printed at the retail level and affixed to the packaged goods, need not be separately weighed for each of the selected ones of the samples, since such labels may be known to be produced with a highly consistent weight. In this case, a single measurement may be taken for such a component and utilized as the component weight for each set of components making up the selected ones of the samples.

The measuring of each component making up the packaging in analyzing the net weight of packaged goods is an important aspect of the present invention, in that the individual contribution of each component to the total weight of the packaging may be assessed, recorded, and tracked. Importantly, such a method allows for immediate recognition of consistency deviations for each component as well as to obtain and understanding of the inherent weight variabilities of each component utilized in the packaging. In such a manner, the vendor may be made more acutely aware of factors impacting the tare weight of any given packaged good utilizing the analyzed components. By way of example, a seller of packaged goods who knows the inherent variability of specific components being incorporated into a particular packaged good may adjust the stated net weight of the goods based on the measured gross weight of the packaged goods given the use of a known set of packaging components. Such a proportional adjustment based on the inherent variabilities of given packaging components may be done to ensure that the stated net weight of the goods at issue is not greater than the actual net weight of the goods.

A further example of the usefulness of the present invention is in tracking individual component weights over time. Where replications of the same component are repeatedly utilized in packaging goods, individual component weight values may be tracked over time. As such, changes in a particular component weight value may be immediately recognized by the user so that corrective action may be taken. For example, if a given wrapping material utilized in packaging undergoes a change in manufacturing process which results in a change in a unit mass, each unit of wrapping material utilized subsequent to the manufacturing change will be immediately recognized through the analysis procedure of the present invention as having a different weight than what had been used prior to the change in manufacturing of the wrapping material. Once such a change is realized, the user can adjust tare settings across product lines to account for the change in unit mass of the wrapping material. Conventional net weight analysis methods, by contrast, would fail to immediately reveal such a change in unit mass, due to the fact that each of the components of the packaging are weighed together in such methodologies. As such, there is no clear way to detect the source of the sudden change in tare weight.

Once the component weights have been measured for each component of the selected ones of the samples, an average component weight value is computed for each component. In other words, the statistical weight average of each component is computed across the component sets tested. Such a procedure is particularly useful where more than one set of components is individually weighed on the weighing device.

In other embodiments of the present invention, a maximum or minimum component value may be utilized in summing the component weight values into a summed tare value. Such a methodology is useful where either a maximum or minimum "buffer zone" of variation from the actual net weight of the goods is desired. However, the preferred embodiment of the present invention involves obtaining an average component weight for each component tested.

The average component weight values are then preferably summed into a summed tare value, which represents a subtractive tare value to assign to each gross sample weight measured in order to determine a net weight of the goods at issue. As illustrated in FIG. 1, an actual net weight value for each of the one or more samples is calculated by subtracting the summed tare from the respective gross weight values of the one or more samples. From the calculated actual net weight of each sample, a weight error value for each sample may be calculated by subtracting respective stated net weight values from respective actual net weight values of each sample. The weight error value represents the error reported by the stated net weight of the goods, as compared to the actual net weight of the goods. As such, if the calculated weight error is a positive value, the actual net weight of the goods is greater than the stated net weight. Likewise, the actual net weight of the goods is less than the stated net weight of the goods where the weight error is a negative value.

As discussed above, it is an object of the present invention to both quantify and isolate sources of error in stated net weight values of packaged goods. The absolute values of the weight error, therefore, are desired to be minimized while simultaneously eliminating any negative weight errors of a magnitude greater than a tolerance level allowed by governmental enforcement agencies. In other words, the method of the present invention allows sellers of packaged goods to investigate an analyze the accuracy of stated net weight values, so that overstated net weight is eliminated while understated net weight is minimized.

To assist users in this analysis, the method of the present invention provides a utility of assigning weight error tolerance levels to the weight error values. Such utility is illustrated in the flow diagram of FIG. 2, wherein the calculated weight error obtained from the method illustrated in FIG. 1 is initially reviewed to determine whether the weight error value is positive or negative. If the calculated weight error is positive, the user is instructed to take minimizing corrective actions such as to reduce the stated net weight, increase unit prices to overcome losses incurred by overstating the net weight, and the like. If, however, the calculated weight error is negative in value, the method of the present invention assigns weight error tolerance levels.

Figure 2:
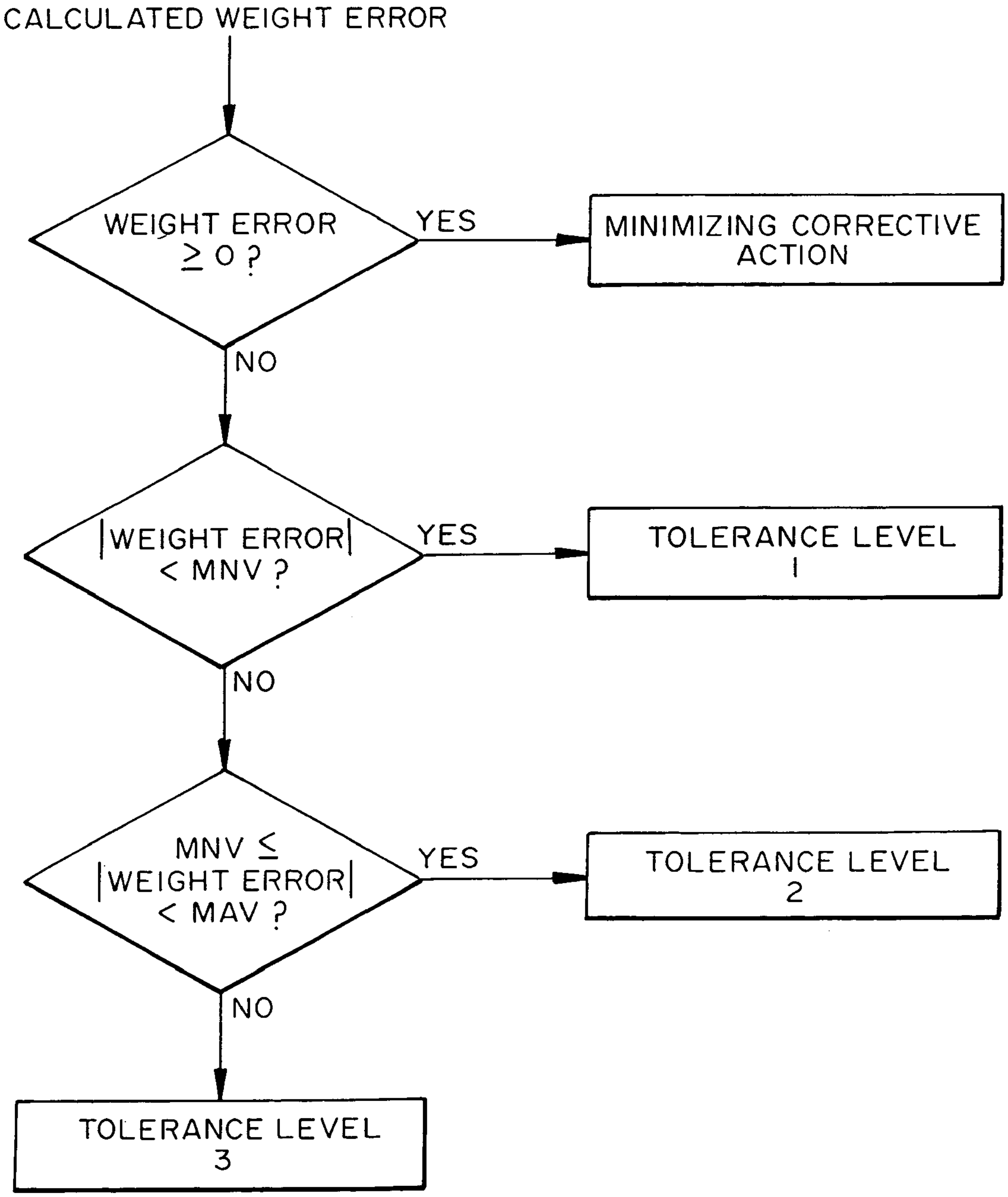
FIG. 2 is a flow diagram of an analysis method of the present invention.

As further illustrated in FIG. 2, a first tolerance level is assigned where the absolute value of the weight error is less than a maximum negative value (MNV), which is described in greater detail herein below. A second error tolerance level is assigned to an absolute weight error value equal to or exceeding the maximum negative value standard, but that is less than a maximum allowable variation (MAV) standard. Finally, a third error tolerance level is assigned to those absolute weight error values which are equal to or exceed the MAV standard. The absolute weight error described herein refers to the magnitude of the weight error value, whether positive or negative. For example, a weight error value of +0.25 has an absolute value of 0.25, and a weight error value of −0.25 has an absolute value of 0.25.

Preferably, the tolerance levels assigned as described above and in reference to FIG. 2 dictate to the user ascending degrees of corrective action needed to bring the packaged goods at issue into compliance with tolerance levels allowed by governmental enforcement agencies. As such, the method of the present invention provides for instructions to the user that are more informative than merely a pass-fail standard typically employed by conventional testing methodologies. Such corrective actions may include, for example, decreasing the stated net weights generally, employing random pack procedures in place of standard pack procedures, weighing a larger sample lot, and the like.

The maximum negative value (MNV) standard is a unique tolerance level assignable by the method of the present invention, and represents a percentage of the actual net weight of the particular goods at issue. Specifically, the MMV standard is calculated by the following formula:

MNV=(corrective factor)*(MAV);

wherein the corrective factor is between 0 and 1; and wherein MAV is assigned from the midpoint of the weight error values.

MAV is a standard assigned in, for example, Table 2–5 of NIST Handbook 133. Accordingly, the MNV standard of the present invention represents a higher level of accuracy required in assigning net weight values than the MAV tolerance standard set forth by NIST Handbook 133.

In addition to the tolerance levels referred to above, the method of the present invention further contemplates determining the maximum negative error value in the sample lot, and conveying such a maximum error value to the user. In this case, the user readily recognizes the worst case scenario for the weight error within the sample lot. Moreover, the method of the present invention contemplates calculating an average weight error value for the sample lot.

In a further embodiment of the present invention, an automated system for analyzing the net weights of packaged goods may be employed for automatically recording and computing the values described above with reference to FIGS. 1 and 2. Such an automated system may further include additional operational features, which are described in greater detail hereinbelow.

Figure 3:
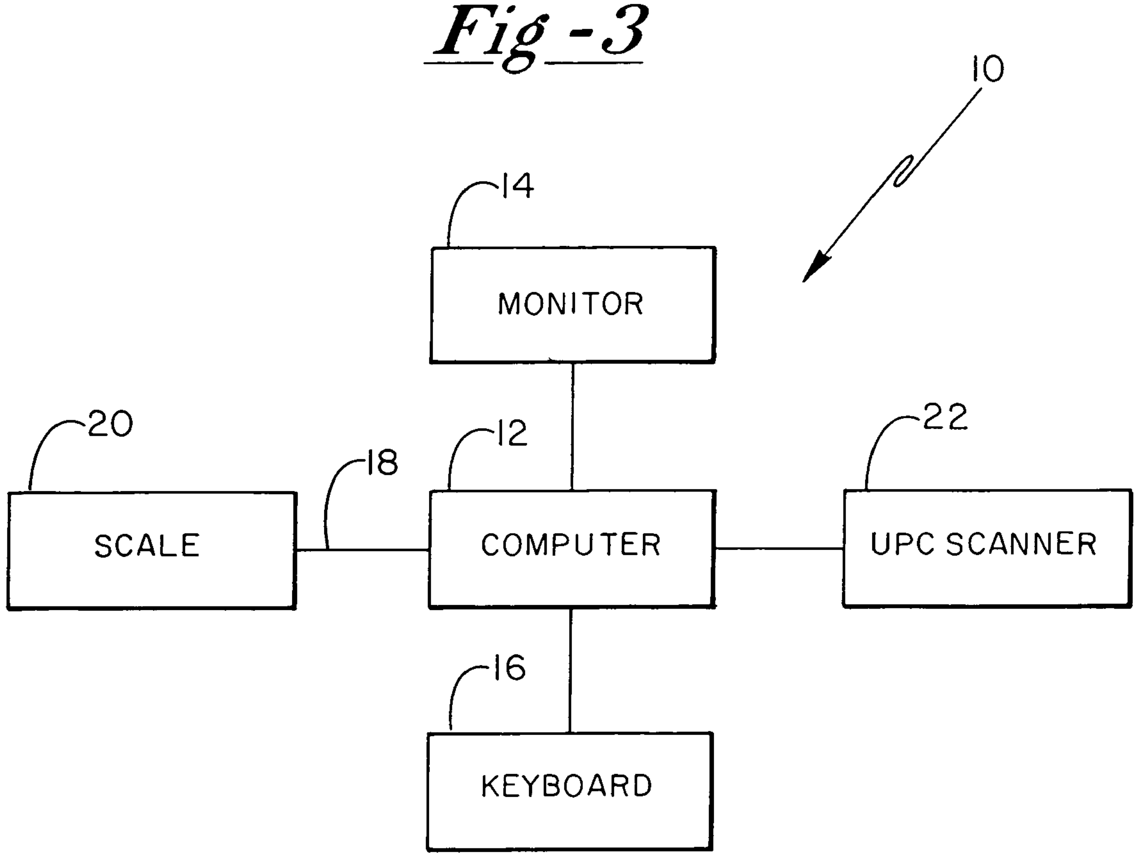
FIG. 3 is a schematic diagram illustrating an analysis system of the present invention.

As illustrated in FIG. 3, system 10 of the present invention preferably includes a computer 12 having a data processor and memory means, a monitor 14, and keyboard 16 operably coupled to computer 12, with monitor 14 acting as a visual display device, and keyboard 16 operably acting as a data entry device. Other devices for entering data into computer 12, however, are contemplated by the applicant. System 10 preferably further includes software that is executable through computer 12, which software establishes an operable data transfer interface 18 between a weighing scale 20 and computer 12. The computer-executable software defines a data input and manipulation utility that follows the methodology described above with reference to FIGS. 1 and 2.

In a particular embodiment, individual samples of a sample lot are identified and imputed into computer 12 via a UPC scanner 22 that is operably coupled to computer 12. As such, UPC scanner 22 is manipulated to optically or magnetically read a, for example, UPC symbol on a particular sample, which results in a digital identifier being transmitted to computer 12 wherein a matching product description stored in the memory means of computer 12 is imported into associated operating fields in the software program of the present invention. In addition to the specific sample identifiers entered into computer 12, other relevant test information such as vendor, evaluation identification, tester, and the like are entered into respective data entry fields of the software program of the invention.

For each entered sample, the corresponding stated net weight is preferably entered into computer 12 via for example, keyboard 16. The packaged sample is then placed on scale 20, with the resultant weight being automatically or manually entered into respective fields of the software system on computer 12. In the same manner, individual component weights are measured on scale 20 and entered into the software program on computer 12.

The software program preferably automatically determines an average component weight value for each component measured, and sums the average weight values into a summed tare, as described above. The software program then further instructs computer to calculate an actual net weight value for each of the one or more samples, as well as a weight error value for each of the one or more samples. The average component weight value, the summed tare, the actual net weight value and the weight error value for each of the one or more samples is visually displayed on monitor 14 in appropriate fields designated by the software program of the present invention.

In preferred embodiments, the program automatically assigns the weight error tolerance levels as described above with reference to FIG. 2, and identifies each weight error value with a unique marker such as a unique color, indicating a corresponding tolerance level in which the weight error value is properly classified.

In addition to the above characteristics, the software program of the present invention preferably further provides for storage and selective recall of sample analysis histories which identify detailed results correlated to particular tested samples performed in the past. Such storage and recall capabilities may be utilized in user-selected categories. For example, the user may recall previously obtained data corresponding to a particular vendor, a date, a tester identification, UPC code, sample description, and the like.

The software program of the present invention further enables the selective generation of a variety of reports that set forth information relevant to the conducted testing procedure that is desired to be reviewed. As part of the reporting capability of the software program of the invention, a proposed cost savings field is provided to the user for assessing the amount of cost savings available to the vendor if corrective measures are taken. Moreover, such cost savings may be further broken down into cost savings achievable through specified ones of available corrective measures. For example, a cost savings assessment associated with proportionately raising the corresponding stated product net weights may be compared and/or contrasted with the price savings available if the products at issue are packaged by random pack procedures as opposed to standard pack procedures.

A further function provided by the software program of the present invention enables a user to retroactively change a component weight such that every sample utilizing such component is automatically re-evaluated, and the weight error value adjusted accordingly. A report is then automatically generating listing all affected samples so that the user can review the changes and provide re-evaluation of summed tares as deemed necessary.

The invention has been described herein in considerable detail in order to comply with the patent statutes, and to provide those skilled in the art with the information needed to apply the novel principles and to use embodiments of the invention as required. However, it is to be understood that the invention can be carried out by specifically different methods, and that various modifications can be accomplished without departing from the scope of the invention itself.

What is claimed is:

1. A method for analyzing net weights of packaged goods, said method comprising:

(a) obtaining a sample lot having one or more samples of said packaged goods, with each of the one or more samples being selected from one class of packaged goods;

(b) recording a stated net weight value for each of said one or more samples in said sample lot;

(c) measuring a gross weight value for each of said one or more samples;

(d) measuring a component weight value for each component making up a respective packaging of at least one of said samples;

(e) determining an average component weight value for each component measured;

(f) summing said average component weight values into a summed tare;

(g) calculating an actual net weight value for each of said one or more samples by subtracting said summed tare from respective gross weight values of said one or more samples; and (h) calculating a weight error value for each of said one or more samples by subtracting respective said stated net weight values from respective said actual net weight values.

2. A method as in claim 1 wherein said sample lot includes at least three samples.

3. A method as in claim 1, including calculating a maximum negative error value standard for each of said one or more samples.

4. A method as in claim 3, including assigning weight error tolerance levels to said weight error values, with a first error tolerance level corresponding to a negative weight error value that is less than the maximum negative value standard, a second error tolerance level corresponding to a negative weight error value equal to or exceeding the maximum negative value standard but that is less than a maximum allowable variation standard, and a third error tolerance level corresponding to a negative weight error value equal to or exceeding a maximum allowable variation standard.

5. A method as in claim 1, including a calculating an average weight error value for the sample lot.

6. A system for analyzing net weights of packaged goods, said system comprising:

(a) a computer means having a data processor and memory means;

(b) software executable through said computer means, said software establishing an operable data transfer interface between a scale and said computer means, and further defining a data input and manipulation utility including the steps of:

(i) inputting a stated net weight value for each of one or more samples from a sample lot of said packaged goods into said computer means through data entry means;

(ii) measuring a gross weight value at said scale for each of said one or more samples, and importing said gross weight values into said computer means;

(iii) measuring a component weight value for each component making up a respective packaging of at least one of said samples, and importing said component weight values into said computer means;

(iv) automatically determining an average component weight value for each component measured;

(v) summing said average component weight values into a summed tare;

(vi) calculating an actual net weight value for each of said one or more samples by subtracting said summed tare from respective gross weight values of said one or more samples;

(vii) calculating a weight error value for each of said one or more samples by subtracting respective said stated net weight values from respective said actual net weight values;

(viii) outputting said weight error values to a visual display means operably coupled to said computer means.

* * * * *